Patented Jan. 29, 1924.

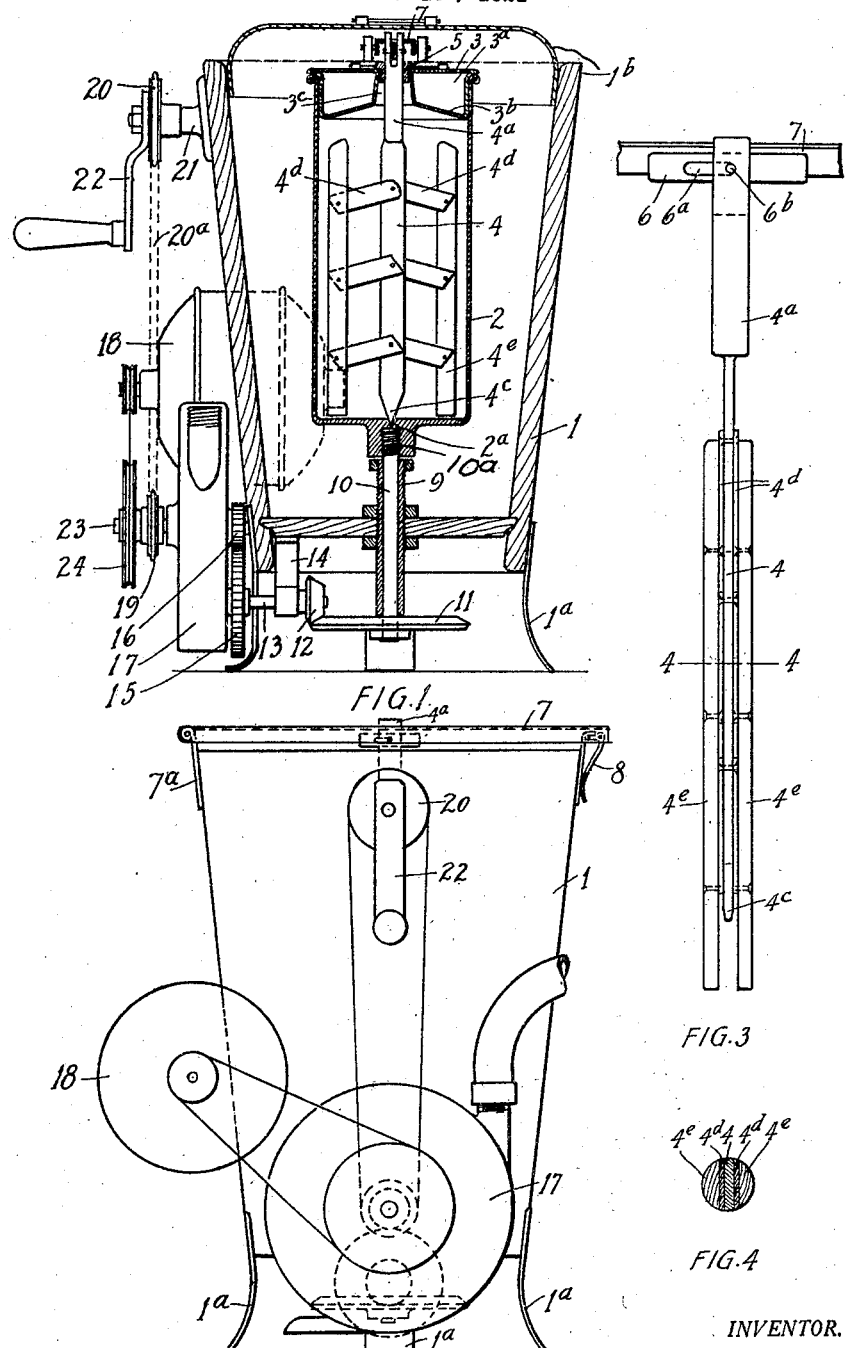

1,482,133

UNITED STATES PATENT OFFICE.

ALVIN L. HART, OF EAST SAN DIEGO, CALIFORNIA.

ICE-CREAM FREEZER.

Application filed June 15, 1921. Serial No. 477,673.

*To all whom it may concern:*

Be it known that I, ALVIN L. HART, a citizen of the United States, residing at East San Diego, in the county of San Diego and State of California, have invented a certain new and useful Ice-Cream Freezer, of which the following is a specification.

My invention relates to ice-cream freezers and the objects of my invention are: First, to provide a collapsible mixer for the cream which may be removed from the cream receptacle without removing the cover and carries with it little or no cream from the receptacle; second, to provide a novelly constructed cream receptacle for ice-cream freezers; third, to provide an ice-cream freezer which is driven from the bottom end so that the top is readily accessible to get at for removing the cream, putting in the ice and to aid in packing the freezer; fourth, to provide a novelly constructed operating mechanism for the freezer; fifth, to provide an ice-cream freezer of this class which may be operated either by hand or by water motor or by electric motor as most convenient and desirable, and sixth, to provide an ice-cream freezer of this class which is simple and economical of construction, durable, easy to manipulate and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of my freezer complete showing some of the parts in elevation to facilitate the illustration. Fig. 2 is a side elevational view thereof at a right angle thereto, Fig. 3 is a detailed side elevational view of the collapsible mixer shown on an enlarged scale and Fig. 4 is a sectional view through 4—4 of Fig. 3.

Similar characters of reference refer to similar parts and portions throughout the several views of the drawings.

The ice receptacle 1, cream receptacle 2, cream receptacle cover 3, mixer 4, bushing 5, latch and handle member 6, supporting member 7, clamp 8 sleeve 9, shaft 10, bevel gear 11, bevel pinion 12, shaft 13, journal 14, gear 15, pinion 16, water motor 17, electric motor 18, sheave 19, sheave 20, shaft support 21, crank 22, shaft 23, and sheave 24, constitute the principal parts and portions of my ice-cream freezer.

The ice receptacle 1 is preferably a wooden receptacle in tapering form as shown best in Figs. 1 and 2 of the drawing. It is supported on leg members $1^a$ and it is preferably provided with a cover $1^b$ shown in Fig. 1 only.

Mounted in a vertical position centrally in the bottom and extending therethrough is a sleeve member 9 which forms a journal for a shaft 10 which is revolubly mounted therein. The upper end of this shaft 10 is provided with threads $10^a$ by means of which it is secured to cream receptacle 2 which extends upwardly centrally in the receptacle 1 so that said cream receptacle 2 may be readily removed. This cream receptacle 2 is provided in its upper end with a cover member 3 which is shaped as shown best in Fig. 1 of the drawing being provided with a hollow vacuum compartment $3^a$ and the lower side of said cover is beveled at $3^b$ and provided with a central tapering hole $3^c$ and mounted in this hole $3^c$ is a bushing 5 which is hollow adapted to fit around the round portion $4^a$ of the mixer shaft 4 and form a close fit thereabout. This shaft member 4 is flattened at its lower end as shown best in Figs. 3 and 4 of the drawings and on its lower end at $4^c$ is pointed adapted to fit into a small recess $2^a$ in the bottom of the cream receptacle for holding this shaft centrally in the said receptacle. Pivotally mounted on this flat portion on opposite sides thereof are the one ends of the bars $4^d$. The other ends of said members $4^d$ are pivotally connected to the flat side of part-round wooden bar members $4^e$. It will be noted that the bars $4^d$ are so positioned and of such length that they will fold up against the flat portion of the shaft 4 and the members $4^e$ positioned over them thus providing a round cylindrical form as shown best in Fig. 4 which is adapted to pass through the hole $3^c$, collapsed as shown in Figs. 3 and 4 of the drawings.

It will be noted that the bushing 5 passes out with the collapsed mixer and then the hole in the cover 3 may be plugged with a cork. This shaft member 4 is provided with a key member 6 which is provided with an elongated hole $6^a$ therein mounted on a pin 6ᵇ. This key member 6ª may be positioned in a vertical position or turned down as shown best in Fig. 3 of the drawing and serve as a key to prevent the turning of the member 4 with the revolution of the receptacle 2 the key member being positioned in the channel member 7 which extends across the top of the receptacle 1 and is hinged thereto by means of a hinge 7ª on one end and is supported at the other end by means of a cam latch 8.

Secured on the lower end of the shaft 10 outside of the bottom, is a bevel gear 11 which meshes with a bevel pinion 12 which bevel pinion 12 is secured on a shaft 13 which is journaled in the journal member 14 secured on the bottom near one side. Also secured on this shaft 13 is a spur gear 15 which meshes with a spur pinion 16 which is secured on the shaft 23 of the water motor 17. Thus it will be noted that the receptacle 2 is revolved by the water motor 17 through the gears and shaft as described. Applicant has also provided an electric motor to be used in connection with said water motor so that either or both may be used as desired. Also mounted on the shaft 23 is a sheave 19 and mounted near the upper end of the receptacle 1 is a shaft support 21 upon which is revolubly mounted a sheave 20. Connecting the sheave 20 and 19 is a belt 20ª and to the sheave 20 is secured a crank member 22 thus providing means for operating the shaft 23 by hand if desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

It is obvious that with this construction there is provided an ice-cream freezer which is operated from the lower end so that the operating parts are all down out of the way so that the freezer is readily accessible at the top for any purpose desired; that the paddle or mixing member will collapse by reason of the upper ends of the members 4ᵉ engaging the beveled portion 3ᵇ of the cover 3 forcing them downward relatively to the member 4 until the members 4ᵉ are in a position so that their flat surface is near the flat surface of the member 4 presenting a cylindrical form as it is drawn out of the hole 3ᶜ together with the bushing 5 which is carried out with it, thus providing a means of removing the mixing device from the cream receptacle without removing the cover and also providing a mixer of this class which will remove a very small quantity of cream with it; that the freezer may be operated in several different ways as desired, more particularly by reason of its being driven from the lower end instead of the upper as is usual; that there is provided a novelly constructed ice-cream freezer.

Having thus described my invention what I claim as new and desire to secure by Letters Patent is:

1. In an ice-cream freezer, a revoluble cream receptacle an hermetically sealed cover provided with a small central hole and a collapsible stationary mixing member mounted therein adapted to be removed through said small central hole in said cover without removing said cover.

2. In an ice-cream freezer, a revoluble cream receptacle, and a collapsible stationary mixing member mounted therein, comprising a central shaft, a plurality of bars with their ends pivotally mounted on said shaft and other bars pivotally mounted on the opposite ends of said bars and a cover beveled on its under side provided for said cream receptacle adapted to be engaged by said last mentioned bars for moving them into close proximity to each other and said shaft with their movement upwardly.

3. In an ice-cream freezer, a cream receptacle provided with a cover, provided with a lower beveled surface, and with a central tapering hole therethrough, a main central supporting shaft extending through said hole and its lower end pivotally mounted centrally in said cream receptacle, a plurality of bars with their one ends pivotally mounted on said shaft, other bars upon which the other ends of said bars are pivotally mounted whereby, when said shaft is moved upwardly, said other bars engage said beveled lower surface of the cover and collapse the same into a compact form whereby it may be drawn through the central hole in said cover.

4. In an ice-cream freezer, a cream receptacle provided with a hollow sealed cover, provided with a lower beveled surface, and with a central hole therethrough, a main central supporting shaft extending through said hole and its lower end pivotally mounted centrally in said cream receptacle, a plurality of bars with their one ends pivotally mounted on said shaft, other bars upon which the other ends of said bars are pivotally mounted whereby, when said shaft is moved upwardly, said other bars engage said beveled lower surface of the cover and collapse the same into a compact form whereby it may be drawn through the central hole in said cover and means for supporting said main shaft member to prevent its turning.

In testimony whereof, I have hereunto set my hand at San Diego, California, this 9th day of June, 1921.

ALVIN L. HART.